United States Patent
Bollinger

(10) Patent No.: US 7,802,426 B2
(45) Date of Patent: Sep. 28, 2010

(54) SYSTEM AND METHOD FOR RAPID ISOTHERMAL GAS EXPANSION AND COMPRESSION FOR ENERGY STORAGE

(75) Inventor: Benjamin R. Bollinger, Windsor, VT (US)

(73) Assignee: SustainX, Inc., West Lebanon, NH (US)

( * ) Notice: Subject to any disclaimer, the term of this patent is extended or adjusted under 35 U.S.C. 154(b) by 0 days.

(21) Appl. No.: 12/481,235

(22) Filed: Jun. 9, 2009

(65) Prior Publication Data

US 2009/0301089 A1    Dec. 10, 2009

Related U.S. Application Data

(60) Provisional application No. 61/059,964, filed on Jun. 9, 2008.

(51) Int. Cl.
| | |
|---|---|
| *F02G 1/04* | (2006.01) |
| *F16D 31/02* | (2006.01) |
| *F01K 25/02* | (2006.01) |
| *F02C 1/04* | (2006.01) |
| *B66F 7/18* | (2006.01) |
| *F15B 11/072* | (2006.01) |

(52) U.S. Cl. ............... 60/508; 60/398; 60/682; 91/4 R; 91/4 A

(58) Field of Classification Search ........... 60/413–418, 60/508, 512, 516–526, 643, 645, 682; 91/4 R, 91/4 A
See application file for complete search history.

(56) References Cited

U.S. PATENT DOCUMENTS

| | | |
|---|---|---|
| 224,081 A | 2/1880 | Eckart |
| 233,432 A | 10/1880 | Pitchford |
| 1,353,216 A * | 9/1920 | Carlson ............ 417/401 |
| 1,681,280 A | 8/1928 | Bruckner |
| 2,025,142 A | 12/1935 | Zahm et al. |
| 2,042,991 A | 6/1936 | Harris, Jr. |
| 2,280,100 A | 4/1942 | Singleton |

(Continued)

FOREIGN PATENT DOCUMENTS

CH    201125855    10/2008

(Continued)

OTHER PUBLICATIONS

"Hydraulic Transformer Supplies Continous High Pressure," Machine Design, Penton Media, vol. 64, No. 17, (Aug. 1992), 1 page.

(Continued)

*Primary Examiner*—Thomas E Denion
*Assistant Examiner*—Christopher Jetton
(74) *Attorney, Agent, or Firm*—Goodwin Procter LLP

(57) ABSTRACT

The invention relates to systems and methods for rapidly and isothermally expanding gas in a cylinder. The cylinder is used in a staged hydraulic-pneumatic energy conversion system and includes a gas chamber (pneumatic side) and a fluid chamber (hydraulic side) and a piston or other mechanism that separates the gas chamber and fluid chamber while allowing the transfer of force/pressure between each opposing chamber. The gas chamber of the cylinder includes ports that are coupled to a heat transfer subassembly that circulates gas from the pneumatic side and exchanges its heat with a counter flow of ambient temperature fluid from a reservoir or other source.

16 Claims, 7 Drawing Sheets

U.S. PATENT DOCUMENTS

| | | |
|---|---|---|
| 2,404,660 A | 7/1946 | Rouleau |
| 2,420,098 A | 5/1947 | Rouleau |
| 2,539,862 A | 1/1951 | Rushing |
| 2,712,728 A | 7/1955 | Lewis et al. |
| 2,813,398 A | 11/1957 | Wilcox |
| 2,829,501 A | 4/1958 | Walls |
| 2,880,759 A | 4/1959 | Wisman |
| 3,538,340 A | 11/1970 | Lang |
| 3,608,311 A | 9/1971 | Roesel, Jr. |
| 3,672,160 A | 6/1972 | Kim |
| 3,677,008 A | 7/1972 | Koutz |
| 3,757,517 A | 9/1973 | Rigollot |
| 3,801,793 A | 4/1974 | Goebel |
| 3,839,863 A | 10/1974 | Frazier |
| 3,847,182 A | 11/1974 | Greer |
| 3,895,493 A | 7/1975 | Rigollot |
| 3,935,469 A | 1/1976 | Haydock |
| 3,939,356 A | 2/1976 | Loane |
| 3,945,207 A | 3/1976 | Hyatt |
| 3,952,516 A | 4/1976 | Lapp |
| 3,958,899 A | 5/1976 | Coleman, Jr. et al. |
| 3,986,354 A | 10/1976 | Erb |
| 3,988,897 A | 11/1976 | Strub |
| 3,991,574 A | 11/1976 | Frazier |
| 3,996,741 A | 12/1976 | Herberg |
| 3,998,049 A | 12/1976 | McKinley et al. |
| 4,009,587 A * | 3/1977 | Robinson et al. ............... 62/116 |
| 4,027,993 A | 6/1977 | Wolff |
| 4,030,303 A | 6/1977 | Kraus et al. |
| 4,031,704 A | 6/1977 | Moore et al. |
| 4,041,708 A | 8/1977 | Wolff |
| 4,100,745 A | 7/1978 | Gyarmathy et al. |
| 4,117,696 A | 10/1978 | Fawcett et al. |
| 4,126,000 A | 11/1978 | Funk |
| 4,142,368 A | 3/1979 | Mantegani |
| 4,147,204 A | 4/1979 | Pfenninger |
| 4,150,547 A | 4/1979 | Hobson |
| 4,170,878 A | 10/1979 | Jahnig |
| 4,197,700 A | 4/1980 | Jahnig |
| 4,197,715 A | 4/1980 | Fawcett et al. |
| 4,209,982 A | 7/1980 | Pitts |
| 4,220,006 A | 9/1980 | Kindt |
| 4,232,253 A | 11/1980 | Mortelmans |
| 4,237,692 A | 12/1980 | Ahrens et al. |
| 4,242,878 A | 1/1981 | Brinkerhoff |
| 4,246,978 A | 1/1981 | Schulz et al. |
| 4,273,514 A | 6/1981 | Shore et al. |
| 4,275,310 A | 6/1981 | Summers et al. |
| 4,293,323 A | 10/1981 | Cohen |
| 4,317,439 A | 3/1982 | Emmerling |
| 4,341,072 A | 7/1982 | Clyne |
| 4,348,863 A | 9/1982 | Taylor et al. |
| 4,353,214 A | 10/1982 | Gardner |
| 4,367,786 A | 1/1983 | Hafner et al. |
| 4,368,775 A | 1/1983 | Ward |
| 4,370,559 A | 1/1983 | Langley, Jr. |
| 4,372,114 A | 2/1983 | Burnham |
| 4,375,387 A | 3/1983 | deFilippi et al. |
| 4,411,136 A | 10/1983 | Funk |
| 4,444,011 A | 4/1984 | Kolin |
| 4,449,372 A | 5/1984 | Rilett |
| 4,454,429 A | 6/1984 | Buonome |
| 4,478,553 A | 10/1984 | Leibowitz et al. |
| 4,489,554 A | 12/1984 | Otters |
| 4,502,284 A | 3/1985 | Chrisoghilos |
| 4,530,208 A | 7/1985 | Sato |
| 4,547,209 A | 10/1985 | Netzer |
| 4,589,475 A | 5/1986 | Jones |
| 4,593,202 A | 6/1986 | Dickinson |
| 4,619,225 A | 10/1986 | Lowther |
| 4,693,080 A | 9/1987 | Van Hooff |
| 4,761,118 A | 8/1988 | Zanarini et al. |
| 4,765,142 A | 8/1988 | Nakhamkin |
| 4,765,143 A | 8/1988 | Crawford et al. |
| 4,849,648 A | 7/1989 | Longardner |
| 4,870,816 A | 10/1989 | Nakhamkin |
| 4,872,307 A | 10/1989 | Nakhamkin |
| 4,873,828 A | 10/1989 | Laing et al. |
| 4,873,831 A | 10/1989 | Dehne |
| 4,877,530 A | 10/1989 | Moses |
| 4,886,534 A | 12/1989 | Castan |
| 4,907,495 A | 3/1990 | Sugahara |
| 4,936,109 A | 6/1990 | Longardner |
| 4,942,736 A | 7/1990 | Bronicki |
| 4,984,432 A | 1/1991 | Corey |
| 5,056,601 A | 10/1991 | Grimmer |
| 5,058,385 A | 10/1991 | Everett, Jr. |
| 5,107,681 A | 4/1992 | Wolfbauer, III |
| 5,133,190 A | 7/1992 | Abdelmalek |
| 5,152,260 A | 10/1992 | Erickson et al. |
| 5,169,295 A | 12/1992 | Stogner et al. |
| 5,182,086 A | 1/1993 | Henderson et al. |
| 5,239,833 A | 8/1993 | Fineblum |
| 5,271,225 A | 12/1993 | Adamides |
| 5,321,946 A | 6/1994 | Abdelmalek |
| 5,339,633 A | 8/1994 | Fujii et al. |
| 5,341,644 A | 8/1994 | Nelson |
| 5,344,627 A | 9/1994 | Fujii et al. |
| 5,364,611 A | 11/1994 | Iijima et al. |
| 5,387,089 A | 2/1995 | Stogner et al. |
| 5,394,693 A | 3/1995 | Plyter |
| 5,448,889 A | 9/1995 | Bronicki |
| 5,454,426 A | 10/1995 | Moseley |
| 5,467,722 A | 11/1995 | Meratla |
| 5,491,969 A | 2/1996 | Cohn et al. |
| 5,524,821 A | 6/1996 | Yie et al. |
| 5,537,822 A | 7/1996 | Shnaid et al. |
| 5,562,010 A | 10/1996 | McGuire |
| 5,579,640 A * | 12/1996 | Gray et al. ..................... 60/413 |
| 5,584,664 A | 12/1996 | Elliott et al. |
| 5,598,736 A | 2/1997 | Erskine |
| 5,600,953 A | 2/1997 | Oshita et al. |
| 5,616,007 A | 4/1997 | Cohen |
| 5,634,340 A | 6/1997 | Grennan |
| 5,641,273 A | 6/1997 | Moseley |
| 5,674,053 A | 10/1997 | Paul et al. |
| 5,769,610 A | 6/1998 | Paul et al. |
| 5,771,693 A | 6/1998 | Coney |
| 5,778,675 A | 7/1998 | Nakhamkin |
| 5,819,533 A | 10/1998 | Moonen |
| 5,819,635 A | 10/1998 | Moonen |
| 5,831,757 A | 11/1998 | DiFrancesco |
| 5,832,728 A | 11/1998 | Buck |
| 5,832,906 A | 11/1998 | Douville et al. |
| 5,839,270 A | 11/1998 | Jirnov et al. |
| 5,901,809 A | 5/1999 | Berkun |
| 5,934,063 A | 8/1999 | Nakhamkin |
| 5,937,652 A | 8/1999 | Abdelmalek |
| 5,971,027 A * | 10/1999 | Beachley et al. ............... 138/31 |
| 6,026,349 A | 2/2000 | Heneman |
| 6,029,445 A | 2/2000 | Lech |
| 6,090,186 A | 7/2000 | Spencer |
| 6,145,311 A | 11/2000 | Cyphelly |
| 6,148,602 A | 11/2000 | Demetri |
| 6,153,943 A | 11/2000 | Mistr, Jr. |
| 6,178,735 B1 | 1/2001 | Frutschi |
| 6,179,446 B1 | 1/2001 | Sarmadi |
| 6,188,182 B1 | 2/2001 | Nickols et al. |
| 6,206,660 B1 | 3/2001 | Coney et al. |
| 6,210,131 B1 | 4/2001 | Whitehead |
| 6,216,462 B1 | 4/2001 | Gray, Jr. |
| 6,225,706 B1 | 5/2001 | Keller |
| 6,276,123 B1 | 8/2001 | Chen et al. |
| 6,327,858 B1 | 12/2001 | Negre et al. |

| | | | | | | |
|---|---|---|---|---|---|---|
| 6,352,576 B1 | 3/2002 | Spencer et al. | | 2006/0248886 A1 | 11/2006 | Ma |
| 6,372,023 B1 | 4/2002 | Kiyono et al. | | 2006/0266035 A1 | 11/2006 | Ingersoll et al. |
| 6,389,814 B2 | 5/2002 | Viteri et al. | | 2007/0022754 A1 | 2/2007 | Perkins et al. |
| 6,419,462 B1 | 7/2002 | Horie et al. | | 2007/0074533 A1 | 4/2007 | Hugenroth et al. |
| 6,513,326 B1 | 2/2003 | Maceda et al. | | 2007/0151528 A1 | 7/2007 | Hedman |
| 6,516,615 B1 | 2/2003 | Stockhausen et al. | | 2007/0205298 A1 | 9/2007 | Harrison et al. |
| 6,598,402 B2 | 7/2003 | Kataoka et al. | | 2007/0234749 A1 | 10/2007 | Enis et al. |
| 6,606,860 B2 | 8/2003 | McFarland | | 2007/0245735 A1 | 10/2007 | Ashikian |
| 6,619,930 B2 | 9/2003 | Jansen et al. | | 2008/0000436 A1 | 1/2008 | Goldman |
| 6,629,413 B1 | 10/2003 | Wendt et al. | | 2008/0016868 A1 | 1/2008 | Ochs et al. |
| 6,637,185 B2 | 10/2003 | Hatamiya et al. | | 2008/0072870 A1 | 3/2008 | Chomyszak et al. |
| 6,652,241 B1 | 11/2003 | Alder | | 2008/0087165 A1 | 4/2008 | Wright et al. |
| 6,652,243 B2 | 11/2003 | Krasnov | | 2008/0104939 A1 | 5/2008 | Hoffmann et al. |
| 6,670,402 B1 | 12/2003 | Lee et al. | | 2008/0127632 A1 | 6/2008 | Finkenrath et al. |
| 6,672,056 B2 | 1/2004 | Roth et al. | | 2008/0138265 A1 | 6/2008 | Lackner et al. |
| 6,688,108 B1 | 2/2004 | Van Liere | | 2008/0155976 A1 | 7/2008 | Smith et al. |
| 6,711,984 B2 | 3/2004 | Tagge et al. | | 2008/0164449 A1 | 7/2008 | Gray et al. |
| 6,712,166 B2 | 3/2004 | Rush et al. | | 2008/0202120 A1 | 8/2008 | Karyambas |
| 6,739,131 B1 | 5/2004 | Kershaw | | 2008/0211230 A1 | 9/2008 | Gurin |
| 6,745,569 B2 | 6/2004 | Gerdes | | 2008/0228323 A1 | 9/2008 | Laumer et al. |
| 6,762,926 B1 | 7/2004 | Shiue et al. | | 2008/0233029 A1 | 9/2008 | Fan et al. |
| 6,789,576 B2 | 9/2004 | Umetsu et al. | | 2008/0272597 A1 | 11/2008 | Althaus |
| 6,797,039 B2 | 9/2004 | Spencer | | 2008/0272598 A1 | 11/2008 | Nakhamkin |
| 6,817,185 B2 | 11/2004 | Coney et al. | | 2008/0308168 A1 | 12/2008 | O'Brien, II et al. |
| 6,834,737 B2 | 12/2004 | Bloxham | | 2009/0007558 A1 | 1/2009 | Hall et al. |
| 6,886,326 B2 | 5/2005 | Holtzapple et al. | | 2009/0008173 A1 | 1/2009 | Hall et al. |
| 6,925,821 B2 | 8/2005 | Sienel | | 2009/0010772 A1 | 1/2009 | Siemroth |
| 6,935,096 B2 | 8/2005 | Haiun | | 2009/0020275 A1 | 1/2009 | Neher et al. |
| 6,938,415 B2 | 9/2005 | Last | | 2009/0158740 A1 | 6/2009 | Littau et al. |
| 6,946,017 B2 | 9/2005 | Leppin et al. | | 2009/0229902 A1 | 9/2009 | Stansbury, III |
| 6,948,328 B2 | 9/2005 | Kidwell | | 2009/0322090 A1 | 12/2009 | Wolf |
| 6,959,546 B2 | 11/2005 | Corcoran | | | | |
| 6,964,165 B2 | 11/2005 | Uhl et al. | | FOREIGN PATENT DOCUMENTS | | |
| 6,964,176 B2 | 11/2005 | Kidwell | | CN | 1888328 | 1/2007 |
| 7,000,389 B2 * | 2/2006 | Lewellin .................. 60/512 | | DE | 25 38 870 | 6/1977 |
| 7,040,083 B2 | 5/2006 | Horii et al. | | EP | 0 857 877 | 8/1998 |
| 7,043,920 B2 | 5/2006 | Viteri et al. | | EP | 1 388 442 | 2/2004 |
| 7,047,744 B1 | 5/2006 | Robertson et al. | | EP | 1 780 058 | 5/2007 |
| 7,055,325 B2 | 6/2006 | Wolken | | GB | 722524 | 11/1951 |
| 7,086,231 B2 | 8/2006 | Pinkerton | | GB | 1479940 | 7/1977 |
| 7,107,766 B2 | 9/2006 | Zacche' et al. | | GB | 2 300 673 | 11/1996 |
| 7,107,767 B2 | 9/2006 | Frazer et al. | | JP | 57070970 | 5/1982 |
| 7,124,586 B2 | 10/2006 | Negre et al. | | JP | 58183880 | 10/1982 |
| 7,128,777 B2 | 10/2006 | Spencer | | JP | 60206985 | 10/1985 |
| 7,155,912 B2 | 1/2007 | Enis et al. | | JP | 63227973 | 9/1988 |
| 7,168,929 B2 | 1/2007 | Siegel et al. | | JP | 2247469 | 10/1990 |
| 7,178,337 B2 | 2/2007 | Pflanz | | JP | 3009090 | 1/1991 |
| 7,219,779 B2 | 5/2007 | Bauer et al. | | JP | 200346093 | 12/2000 |
| 7,273,122 B2 | 9/2007 | Rose | | JP | 2002127902 | 5/2002 |
| 7,322,377 B2 | 1/2008 | Baltes | | JP | 2008038658 | 2/2008 |
| 7,328,575 B2 | 2/2008 | Hedman | | KR | 2004004637 | 1/2004 |
| 7,347,049 B2 | 3/2008 | Rajendran et al. | | WO | WO-88/02818 | 4/1988 |
| 7,353,845 B2 | 4/2008 | Underwood et al. | | WO | WO-9412785 | 6/1994 |
| 7,354,252 B2 | 4/2008 | Baatrup et al. | | WO | WO-97/17546 | 5/1997 |
| 7,407,501 B2 | 8/2008 | Zvuloni | | WO | WO-00/37800 | 6/2000 |
| 7,415,835 B2 | 8/2008 | Cowans et al. | | WO | WO-00/68578 | 11/2000 |
| 7,441,399 B2 | 10/2008 | Utamura | | WO | WO-0175290 | 10/2001 |
| 7,469,527 B2 | 12/2008 | Negre et al. | | WO | WO-2007/086792 | 8/2007 |
| 7,481,337 B2 | 1/2009 | Luharuka et al. | | WO | WO-2008023901 | 2/2008 |
| 7,607,503 B1 | 10/2009 | Schechter | | WO | WO-2008045468 | 4/2008 |
| 2003/0180155 A1 | 9/2003 | Coney et al. | | WO | WO-2008102292 | 8/2008 |
| 2004/0244580 A1 | 12/2004 | Coney et al. | | WO | WO-2008139267 | 11/2008 |
| 2005/0028529 A1 | 2/2005 | Bartlett et al. | | | | |
| 2005/0072154 A1 | 4/2005 | Frutschi | | | | |
| 2005/0155347 A1 | 7/2005 | Lewellin | | | | |
| 2006/0059937 A1 | 3/2006 | Perkins et al. | | | | |
| 2006/0075749 A1 | 4/2006 | Cherney et al. | | | | |
| 2006/0090467 A1 | 5/2006 | Crow | | | | |
| 2006/0107664 A1 | 5/2006 | Hudson et al. | | | | |
| 2006/0175337 A1 | 8/2006 | Defosset | | | | |
| 2006/0201148 A1 | 9/2006 | Zabtcioglu | | | | |

OTHER PUBLICATIONS

Lemofouet, "Investigation and Optimisation of Hybrid Electricity Storage Systems Based on Compressed Air and Supercapacitors," (Oct. 20, 2006), 250 pages.

Cyphelly et al., "Usage of Compressed Air Storage Systems," BFE-Program "Electricity," Final Report May 2004, 14 pages.

* cited by examiner

SYSTEM AND METHOD FOR RAPID ISOTHERMAL GAS EXPANSION AND COMPRESSION FOR ENERGY STORAGE

CROSS-REFERENCE TO RELATED APPLICATIONS

This application claims priority to U.S. Provisional Patent Application Ser. No. 61/059,964, filed on Jun. 9, 2008, the disclosure of which is hereby incorporated herein by reference in its entirety.

STATEMENT REGARDING FEDERALLY SPONSORED RESEARCH

This invention was made with government support under IIP-0810590 awarded by the NSF. The government has certain rights in the invention.

FIELD OF THE INVENTION

This invention relates to systems and methods for storing and recovering electrical energy using compressed gas, and more particularly to systems and methods for improving such systems and methods by rapid isothermal expansion and compression of the gas.

BACKGROUND OF THE INVENTION

As the world's demand for electric energy increases, the existing power grid is being taxed beyond its ability to serve this demand continuously. In certain parts of the United States, inability to meet peak demand has led to inadvertent brownouts and blackouts due to system overload and deliberate "rolling blackouts" of non-essential customers to shunt the excess demand. For the most part, peak demand occurs during the daytime hours (and during certain seasons, such as summer) when business and industry employ large quantities of power for running equipment, heating, air conditioning, lighting, etc. During the nighttime hours, thus, demand for electricity is often reduced significantly, and the existing power grid in most areas can usually handle this load without problem.

To address the lack of power at peak demand, users are asked to conserve where possible. Power companies often employ rapidly deployable gas turbines to supplement production to meet demand. However, these units burn expensive fuel sources, such as natural gas, and have high generation costs when compared with coal-fired systems, and other large-scale generators. Accordingly, supplemental sources have economic drawbacks and, in any case, can provide only a partial solution in a growing region and economy. The most obvious solution involves construction of new power plants, which is expensive and has environmental side effects. In addition, because most power plants operate most efficiently when generating a relatively continuous output, the difference between peak and off-peak demand often leads to wasteful practices during off-peak periods, such as over-lighting of outdoor areas, as power is sold at a lower rate off peak. Thus, it is desirable to address the fluctuation in power demand in a manner that does not require construction of new plants and can be implemented either at a power-generating facility to provide excess capacity during peak, or on a smaller scale on-site at the facility of an electric customer (allowing that customer to provide additional power to itself during peak demand, when the grid is over-taxed).

Additionally, it is desirable for solutions that address the fluctuations in power demand to also address environmental concerns and include using renewable energy sources. As demand for renewable energy increases, the intermittent nature of some renewable energy sources (e.g., wind and solar) places an increasing burden on the electric grid. The use of energy storage is a key factor in addressing the intermittent nature of the electricity produced by renewable sources, and more generally in shifting the energy produced to the time of peak demand.

Storing energy in the form of compressed air has a long history. Most methods for converting potential energy in the form of compressed air to electrical energy utilize turbines to expand the gas, which is an inherently adiabatic process. As gas expands, it cools off if there is no input of heat (adiabatic gas expansion), as is the case with gas expansion in a turbine. The advantage of adiabatic gas expansion is that it can occur quickly, thus resulting in the release of a substantial quantity of energy in a short time frame.

However, if the gas expansion occurs slowly relative to the time with which it takes for heat to flow into the gas, then the gas remains at a relatively constant temperature as it expands (isothermal gas expansion). Gas stored at ambient temperature, which is expanded isothermally, recovers approximately three times the energy of ambient temperature gas expanded adiabatically. Therefore, there is a significant energy advantage to expanding gas isothermally.

In the case of certain compressed gas energy storage systems according to prior implementations, gas is expanded from a high-pressure, high-capacity source, such as a large underground cavern, and directed through a multi-stage gas turbine. Because significant expansion occurs at each stage of the operation, the gas cools down at each stage. To increase efficiency, the gas is mixed with fuel and ignited, pre-heating it to a higher temperature, thereby increasing power and final gas temperature. However, the need to burn fossil fuel (or apply another energy source, such as electric heating) to compensate for adiabatic expansion substantially defeats the purpose of an otherwise clean and emission-free energy-storage and recovery process.

A more efficient and novel design for storing energy in the form of compressed gas utilizing isothermal gas expansion and compression is shown and described in U.S. patent application Ser. No. 12/421,057 (the '057 application), the disclosure of which is hereby incorporated herein by reference. The '057 application discloses a system for expanding gas isothermally in staged hydraulic/pneumatic cylinders and intensifiers over a large pressure range in order to generate electrical energy when required. The power output of the system is governed by how fast the gas can expand isothermally. Therefore, the ability to expand/compress the gas isothermally at a faster rate will result in a greater power output of the system.

While it is technically possible to provide a direct heat-exchange subsystem to a hydraulic/pneumatic cylinder, an external jacket, for example, is not particularly effective given the thick walls of the cylinder. An internalized heat exchange subsystem could conceivably be mounted directly within the cylinder's pneumatic side; however, size limitations would reduce such a heat exchanger's effectiveness and the task of sealing a cylinder with an added subsystem installed therein would be significant, and make the use of a conventional, commercially available component difficult or impossible.

Thus, the prior art does not disclose systems and methods for rapidly compressing and expanding gas isothermally that can be used in power storage and recovery, as well as other applications, that allow for the use of conventional, lower cost components.

SUMMARY OF THE INVENTION

The invention overcomes the disadvantages of the prior art by providing systems and methods for rapidly and isothermally expanding gas in a cylinder, which can be a hydraulic/pneumatic converter component in a staged energy storage system that can store high-pressure gas at, for example, over 200 atmospheres (3000 PSI) for use by the system. A pressure vessel or cylinder defining a gas chamber (pneumatic side) and a fluid chamber (hydraulic side) has a piston or other mechanism, which separates the gas chamber and fluid chamber, preventing gas or fluid migration from one chamber to the next, while allowing the transfer of force/pressure between each opposing chamber. Both the gas chamber and the fluid chamber have primary ports that interface with the respective pneumatic and hydraulic components of the overall energy storage and recovery system.

The gas chamber/pneumatic side of the cylinder has additional ports. The additional gas exit port is in fluid communication with an input to a circulation device (for example, a pneumatic pump or fan impeller), the exit of which is in fluid communication with the gas input of a heat exchanger. The gas exit port of the heat exchanger is in fluid connection with the additional gas chamber input port. The heat exchanger has corresponding fluid ports that support a flow of ambient temperature fluid through the heat exchanger in a direction counter to the flow of gas in the heat exchanger. Thus, due to the heat exchange with the flowing fluid, the gas exiting the heat exchanger is returned to the gas chamber at ambient or near ambient temperature. The circulation of gas in the gas chamber through the heat transfer subsystem thereby maintains the gas in the gas chamber at ambient or near-ambient temperature. The entire gas circuit in the heat exchanger is sealed and capable of handling high pressures (for example, up to at least 200 atmospheres) encountered within the pneumatic side of the cylinder. The fluid side of the heat exchanger communicates with an appropriate reservoir of ambient fluid. This reservoir can be an open source, such as a large body of water, a cooling tower or a ground source exchange loop. Notably, the systems and methods of the invention can be implemented using commercially available hydraulic/pneumatic cylinders and intensifiers, and the heat exchanger can likewise, be constructed from commercially available, high-pressure-handling components, thereby reducing the cost and complexity of the overall system. Since the heat exchanger is external of the hydraulic/pneumatic cylinder, it can be located anywhere that is convenient and can be sized as needed to deliver a high rate of heat exchange. In addition, the heat transfer subsystem can be attached to the cylinder with conventional plumbing components/fittings.

Generally, the per-kW capital cost of the system is directly related to the power capacity of the system, which in turn is related to the heat transfer rate. Achieving higher heat transfer rates allows for increased power output for a given desired efficiency. Thus, the heat transfer rate is indirectly related to the capital cost of the system. For example, if the power output is increased by a factor of 4, the system cost ($/kW) is reduced by a factor of 4. Heat transfer can be improved by two primary techniques: increasing the air flow rate through the heat exchanger and increasing the heat transfer area.

In a particular aspect, the invention relates to a system for substantially isothermal expansion and compression of a gas. The system includes a hydraulic cylinder and a heat transfer subsystem. The hydraulic cylinder includes a pneumatic side and a hydraulic side separated by a boundary mechanism that transfers mechanical energy therebetween. The heat transfer subsystem is in fluid communication with the pneumatic side of the hydraulic cylinder, where the gas is expanded and compressed during operation.

In various embodiments of the invention, the hydraulic cylinder can be an accumulator or an intensifier. In further embodiments, the heat transfer subsystem includes a circulation apparatus in fluid communication with the pneumatic side of the hydraulic cylinder and a heat exchanger. The circulation apparatus circulates the gas through the heat transfer subsystem. The heat exchanger includes a first side in fluid communication with the circulation apparatus and the pneumatic side of the hydraulic cylinder and a second side in fluid communication with a fluid source having a substantially constant temperature. The circulation apparatus circulates the gas from the pneumatic side of the hydraulic cylinder, through the heat exchanger, and back to the pneumatic side of the hydraulic cylinder.

In additional embodiments, the heat transfer subsystem can include a second heat exchanger disposed in series with the first heat exchanger. The second heat exchanger includes a first side in fluid communication with the first side of the first heat exchanger and the pneumatic side of the hydraulic cylinder and a second side in fluid communication with the fluid source. The heat transfer subsystem can also include a second heat exchanger disposed in parallel with the first heat exchanger. The second heat exchanger includes a first side in fluid communication with the first side of the first heat exchanger and the pneumatic side of the hydraulic cylinder and a second side in fluid communication with the fluid source. The system and/or heat transfer subsystem can include a control valve arrangement that can be configured to direct selectively the constant temperature fluid source between one or both heat exchangers, or direct selectively the gas between one or both heat exchangers.

In one embodiment, the circulation apparatus can be a pump. The pump can be configured to operate at pressures of up to about 3000 PSI. The pump can be a piston, vane, impeller, and/or gear. The pump can be a positive displacement type pump. In one embodiment, the heat exchanger can be a shell and tube type, a plate type, and/or a radiator type. In addition, the system can include, for example, at least one temperature sensor in communication with the pneumatic side of the hydraulic cylinder for monitoring gas temperature therein, a second temperature sensor for monitoring ambient temperature proximate to the heat transfer subsystem, and/or a third temperature sensor for monitoring the temperature of the gas exiting the heat transfer subsystem. The system can further include a control system for receiving telemetry from the temperature sensors to control operation of the heat transfer subsystem based at least in part on the received telemetry. The fluid source can be a body of water, a cooling tower, a process heat source, and/or a remote environmental heat exchanger. The heat transfer subsystem can remove heat from the gas during a compression cycle of the hydraulic cylinder and add heat to the gas during an expansion cycle of the hydraulic cylinder.

In another aspect, the invention relates to a staged hydraulic-pneumatic energy conversion system that stores and recovers electrical energy using thermally conditioned compressed fluids. The system includes at least one hydraulic cylinder including a pneumatic side and a hydraulic side separated by a boundary mechanism that transfers mechanical energy therebetween and a heat transfer subsystem in fluid communication with the pneumatic side of the hydraulic cylinder.

In various embodiments, the system includes a second hydraulic cylinder including a pneumatic side and a hydraulic side separated by a boundary mechanism that transfers mechanical energy therebetween and a second heat transfer subsystem in fluid communication with the pneumatic side of the second hydraulic cylinder. The first and second hydraulic cylinders are in fluid communication and can be connected either in series or parallel, depending on the type of cylinders used and the particular system application. In one embodiment of the system, the first hydraulic cylinder is an accumulator that transfers the mechanical energy at a first pressure ratio and the second hydraulic cylinder is an intensifier that transfers the mechanical energy at a second pressure ratio greater that the first pressure ratio. The system can also include a control valve arrangement configured to regulate the staged compression and expansion of the hydraulic cylinders. In additional embodiments, the staged hydraulic-pneumatic energy conversion system includes a hydraulic motor/pump in fluid communication with the hydraulic cylinder and an electric generator/motor mechanically coupled to the hydraulic motor/pump.

In another aspect, the invention relates to a method of substantially isothermal expansion and compression of a gas. The method includes the steps of providing a hydraulic cylinder including a pneumatic side and a hydraulic side, expanding and compressing a gas in the pneumatic side of the hydraulic cylinder while transferring mechanical energy via a boundary mechanism separating the pneumatic and hydraulic sides of the hydraulic cylinder, and circulating the gas to maintain a substantially constant temperature of the gas in the pneumatic side of the hydraulic cylinder.

In various embodiments of the method, the gas is circulated through a heat transfer subsystem in fluid communication with the pneumatic side of the hydraulic cylinder. The method can include the step of controlling the circulation of the gas through the heat transfer system based on a temperature of at least one of the gas in the pneumatic side of the hydraulic cylinder, ambient air proximate the heat transfer subsystem, or the gas exiting the heat transfer subsystem. In addition, the heat transfer subsystem can remove heat from the gas when compressing the gas and add heat to the gas when expanding the gas.

These and other objects, along with the advantages and features of the present invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In addition, the drawings are not necessarily to scale, emphasis instead generally being placed upon illustrating the principles of the invention. In the following description, various embodiments of the present invention are described with reference to the following drawings, in which.

DETAILED DESCRIPTION

In the following, various embodiments of the present invention are generally described with reference to a single hydraulic cylinder (for example, an accumulator or an intensifier) and simplified valve arrangements. It is, however, to be understood that the present invention can include any number and combination of accumulators, intensifiers, and valve arrangements. In addition, any dimensional values given are exemplary only, as the systems according to the invention are scalable and customizable to suit a particular application. Furthermore, the terms pneumatic, gas, and air are used interchangeably and the terms hydraulic and fluid are also used interchangeably.

Figure 1:
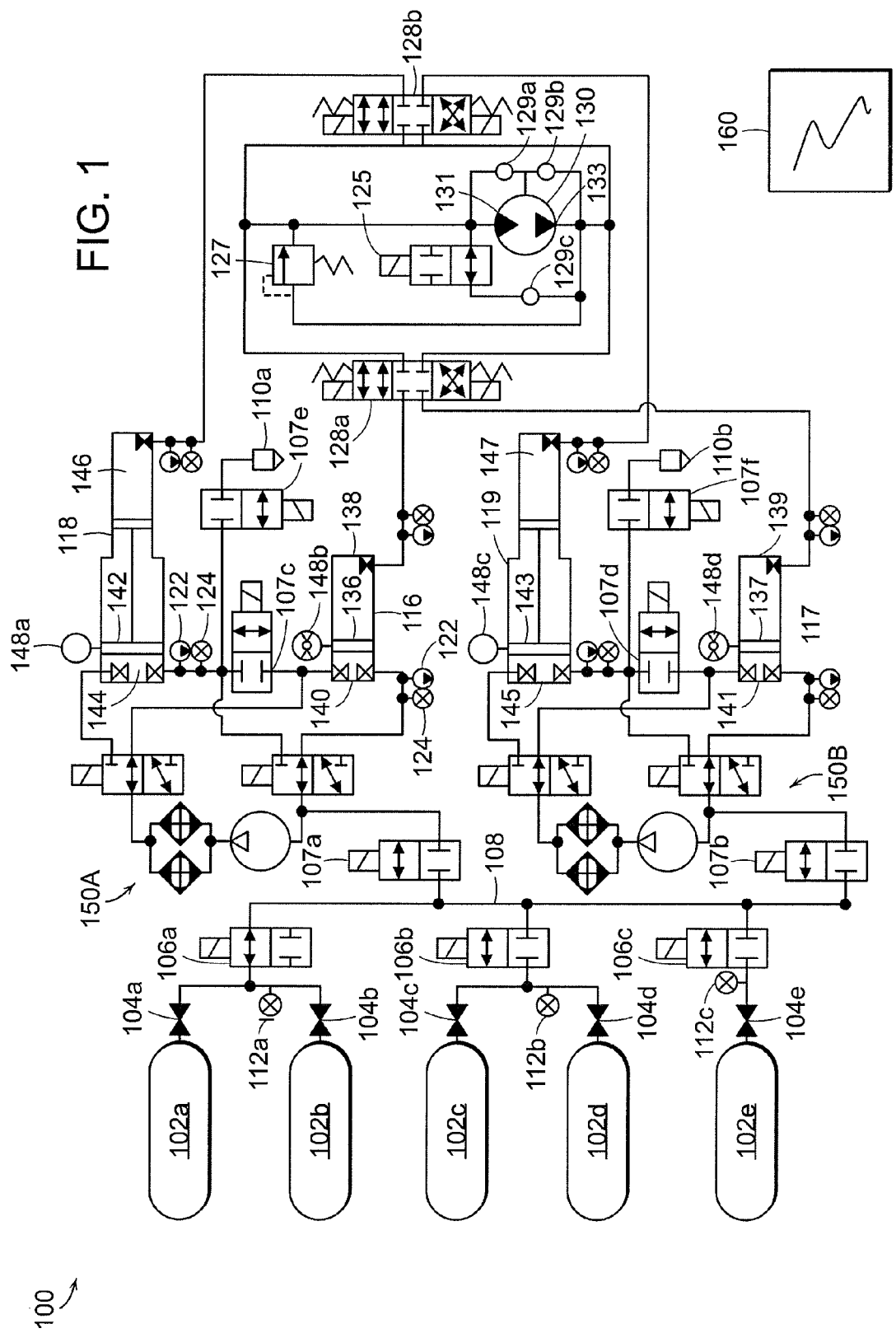
FIG. 1 is a schematic diagram of an open-air hydraulic-pneumatic energy storage and recovery system in accordance with one embodiment of the invention.

FIG. 1 depicts generally a staged hydraulic-pneumatic energy conversion system that stores and recovers electrical energy using thermally conditioned compressed fluids and incorporates various embodiments of the invention. Various types of staged hydraulic-pneumatic energy conversion systems that store and recover electrical energy using compressed fluids are described in U.S. patent application Ser. No. 12/421,057. The inventive concepts described herein can be used with any of those staged hydraulic-pneumatic energy conversion systems.

As shown in FIG. 1, the system 100 includes five high-pressure gas/air storage tanks 102a-102e. Tanks 102a and 102b and tanks 102c and 102d are joined in parallel via manual valves 104a, 104b and 104c, 104d, respectively. Tank 102e also includes a manual shut-off valve 104e. The tanks 102 are joined to a main air line 108 via pneumatic two-way (i.e., shut-off) valves 106a, 106b, 106c. The tank output lines include pressure sensors 112a, 112b, 112c. The lines/tanks 102 could also include temperature sensors. The various sensors can be monitored by a system controller 160 via appropriate connections, as described in the '057 application. The main air line 108 is coupled to a pair of multi-stage (two stages in this example) accumulator circuits via automatically controlled pneumatic shut-off valves 107a, 107b. These valves 107a, 107b are coupled to respective accumulators 116 and 117. The air chambers 140, 141 of the accumulators 116, 117 are connected, via automatically controlled pneumatic shut-offs 107c, 107d, to the air chambers 144, 145 of the intensifiers 118, 119. Pneumatic shut-off valves 107e, 107f are also coupled to the air line connecting the respective accumulator and intensifier air chambers and to a respective atmospheric air vent 110a, 110b. This arrangement allows for air from the various tanks 102 to be selectively directed to either accumulator air chamber 144, 145. In addition, the various air lines and air chambers can include pressure and temperature sensors 122 124 that deliver sensor telemetry to the controller 160.

Figure 1A:
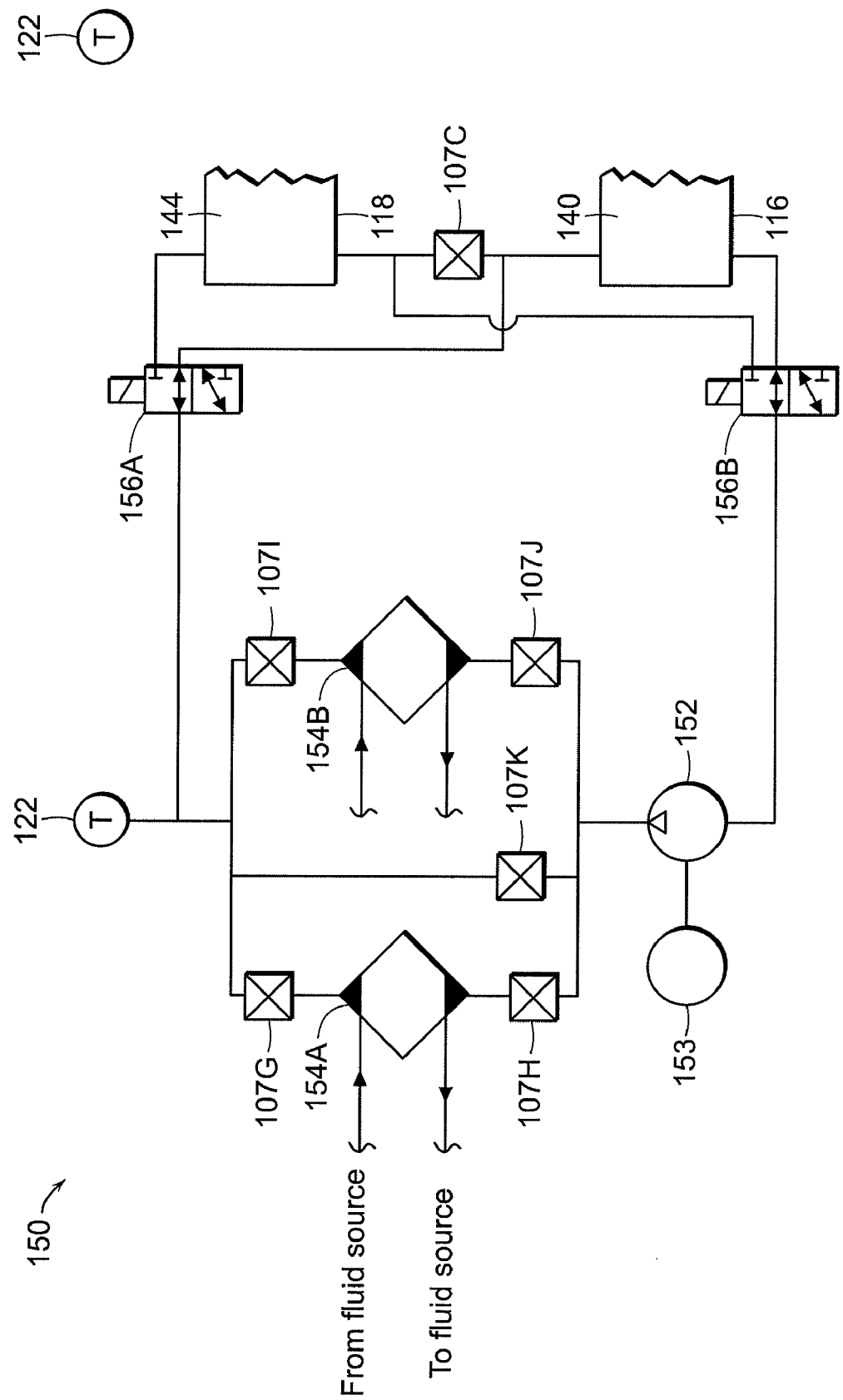
FIG. 1A is an enlarged schematic diagram of a portion of the system of FIG. 1.

The system 100 also includes two heat transfer subsystems 150 in fluid communication with the air chambers 140,141, 144, 145 of the accumulators and intensifiers 116-119 and the high pressure storage tanks 102 that provide the improved isothermal expansion and compression of the gas. A simplified schematic of one of the heat transfer subsystems 150 is shown in greater detail in FIG. 1A. Each heat transfer subsystem 150 includes a circulation apparatus 152, at least one heat exchanger 154, and pneumatic valves 156. One circulation apparatus 152, two heat exchanger 154 and two pneumatic valves 156 are shown in FIGS. 1 and 1A, however, the number and type of circulation apparatus 152, heat exchangers 154, and valves 156 can vary to suit a particular application. The various components and the operation of the heat transfer subsystem 150 are described in greater detail hereinbelow. Generally, in one embodiment, the circulation apparatus 152 is a positive displacement pump capable of operating at pressures up to 3000 PSI or more and the two heat exchanger 154 are tube in shell type (also known as a shell and tube type) heat exchangers 154 also capable of operating at pressures up to 3000 PSI or more. The heat exchangers 154 are shown connected in parallel, although they could also be connected in series. The heat exchangers 154 can have the same or different heat exchange areas. For example, where the heat exchangers 154 are connected in parallel and the first heat exchanger 154A has a heat transfer area of X and the second heat exchanger 154B has a heat transfer area of 2X, a control valve arrangement can be used to selectively direct the gas flow to one or both of the heat exchangers 154 to obtain different heat transfer areas (e.g., X, 2X, or 3X) and thus different thermal efficiencies.

The basic operation of the system 150 is described with respect to FIG. 1A. As shown, the system 150 includes the circulation apparatus 152, which can be driven by, for example, an electric motor 153 mechanically coupled thereto. Other types of and means for driving the circulation apparatus are contemplated and within the scope of the invention. For example, the circulation apparatus 152 could be a combination of accumulators, check valves, and an actuator. The circulation apparatus 152 is in fluid communication with each of the air chambers 140, 144 via a three-way, two position pneumatic valve 156B and draws gas from either air chamber 140, 144 depending on the position of the valve 156B. The circulation apparatus 152 circulates the gas from the air chamber 140, 144 to the heat exchanger 154.

As shown in FIG. 1A, the two heat exchangers 154 are connected in parallel with a series of pneumatic shut-off valves 107G-107J, that can regulate the flow of gas to heat exchanger 154A, heat exchanger 154B, or both. Also included is a by-pass pneumatic shut-off valve 107K that can be used to by-pass the heat exchangers 154 (i.e., the heat transfer subsystem 150 can be operated without circulating gas through either heat exchanger. In use, the gas flows through a first side of the heat exchanger 154, while a constant temperature fluid source flows through a second side of the heat exchanger 154. The fluid source is controlled to maintain the gas at ambient temperature. For example, as the temperature of the gas increases during compression, the gas can be directed through the heat exchanger 154, while the fluid source (at ambient or colder temperature) counter flows through the heat exchanger 154 to remove heat from the gas. The gas output of the heat exchanger 154 is in fluid communication with each of the air chambers 140, 144 via a three-way, two position pneumatic valve 156A that returns the thermally conditioned gas to either air chamber 140, 144, depending on the position of the valve 156A. The pneumatic valves 156 are used to control from which hydraulic cylinder the gas is being thermally conditioned.

The selection of the various components will depend on the particular application with respect to, for example, fluid flows, heat transfer requirements, and location. In addition, the pneumatic valves can be electrically, hydraulically, pneumatically, or manually operated. In addition, the heat transfer subsystem 150 can include at least one temperature sensor 122 that, in conjunction with the controller 160, controls the operation of the various valves 107, 156 and, thus the operation of the heat transfer subsystem 150.

In one embodiment, the heat transfer subsystem is used with a staged hydraulic-pneumatic energy conversion system as shown and described in the '057 application, where the two heat exchangers are connected in series. The operation of the heat transfer subsystem is described with respect to the operation of a 1.5 gallon capacity piston accumulator having a 4-inch bore. In one example, the system is capable of producing 1-1.5 kW of power during a 10 second expansion of the gas from 2900 PSI to 350 PSI. Two tube-in-shell heat exchange units (available from Sentry Equipment Corp., Oconomowoc, Wis.), one with a heat exchange area of 0.11 m2 and the other with a heat exchange area of 0.22 m2, are in fluid communication with the air chamber of the accumulator. Except for the arrangement of the heat exchangers, the system is similar to that shown in FIG. 1A, and shut-off valves can be used to control the heat exchange counter flow, thus providing for no heat exchange, heat exchange with a single heat exchanger (i.e., with a heat exchange area of 0.11 m2 or 0.22 m2), or heat exchange with both heat exchangers (i.e., with a heat exchange area of 0.33 m2.)

During operation of the systems 100, 150, high-pressure air is drawn from the accumulator 116 and circulated through the heat exchangers 154 by the circulation apparatus 152. Specifically, once the accumulator 116 is filled with hydraulic fluid and the piston is at the top of the cylinder, the gas circulation/heat exchanger sub-circuit and remaining volume on the air side of the accumulator is filled with 3,000 PSI air. The shut-off valves 107G-107J are used to select which, if any, heat exchanger to use. Once this is complete, the circulation apparatus 152 is turned on as is the heat exchanger counter-flow.

During gas expansion in the accumulator 116, the three-way valves 156 are actuated as shown in FIG. 1A and the gas expands. Pressure and temperature transducers/sensors on the gas side of the accumulator 116 are monitored during the expansion, as well as temperature transducers/sensors located on the heat transfer subsystem 150. The thermodynamic efficiency of the gas expansion can be determined when the total fluid power energy output is compared to the theoretical energy output that could have been obtained by expanding the known volume of gas perfectly isothermally.

Figure 2:
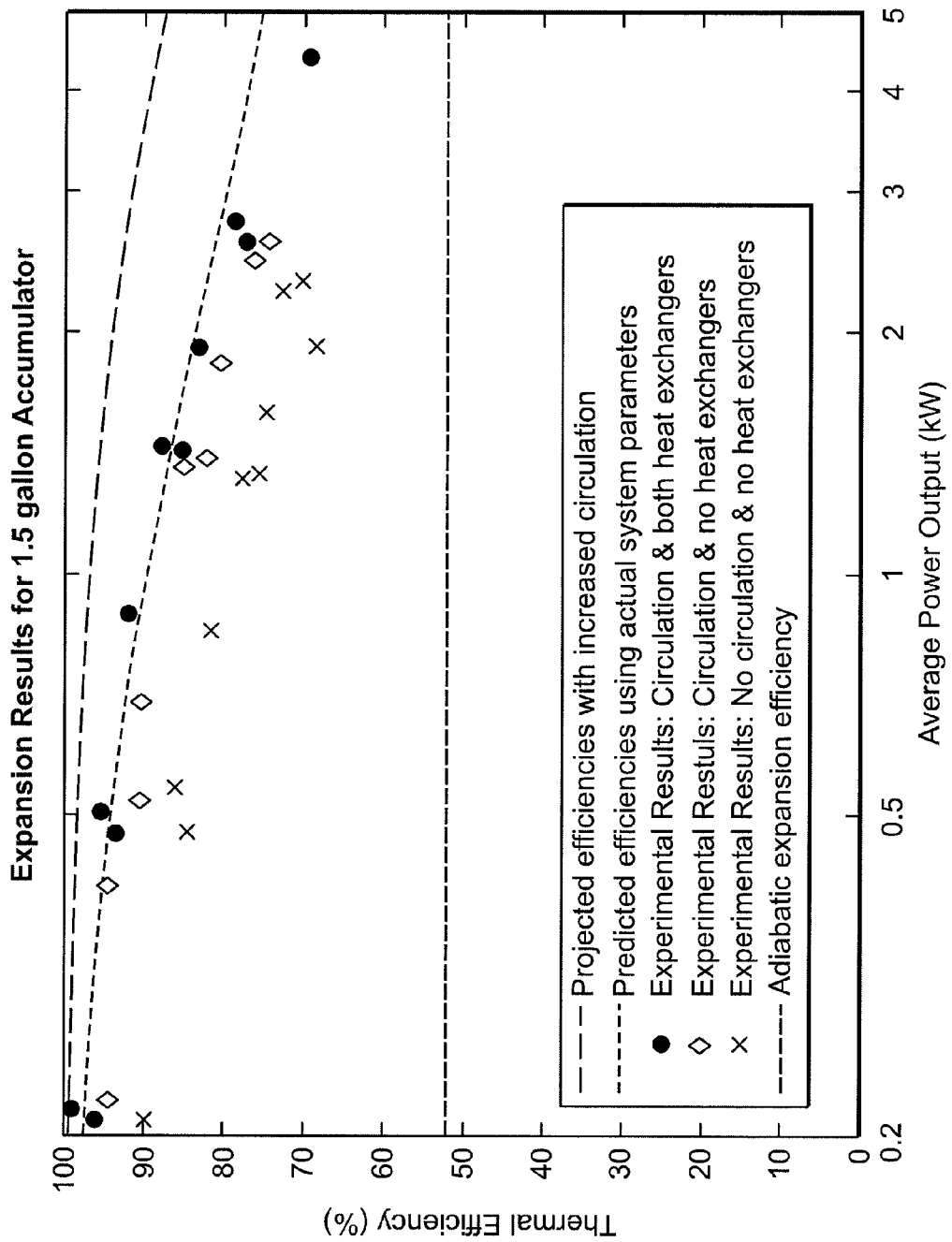
FIG. 2 is a graphical representation of the thermal efficiencies obtained at different operating parameters.

The overall work output and thermal efficiency can be controlled by adjusting the hydraulic fluid flow rate and the heat exchanger area. FIG. 2 depicts the relationship between power output, thermal efficiency, and heat exchanger surface area for this exemplary embodiment of the systems 100, 150. As shown in FIG. 2, there is a trade-off between power output and efficiency. By increasing heat exchange area (e.g., by adding heat exchangers to the heat transfer subsystem 150), greater thermal efficiency is achieved over the power output range. For this exemplary embodiment, thermal efficiencies above 90% can be achieved when using both heat exchangers 154 for average power outputs of ~1.0 kW. Increasing the gas circulation rate through the heat exchangers will also provide additional efficiencies. Based on the foregoing, the selection and sizing of the components can be accomplished to optimize system design, by balancing cost and size with power output and efficiency.

Referring back to FIG. 1 for the remaining description of the basic staged hydraulic-pneumatic energy conversion system, the air chamber 140, 141 of each accumulator 116, 117 is enclosed by a movable piston 136, 137 having an appropriate sealing system using sealing rings and other components that are known to those of ordinary skill in the art. The piston 136, 137 moves along the accumulator housing in response to pressure differentials between the air chamber 140, 141 and an opposing fluid chamber 138, 139, respectively, on the opposite side of the accumulator housing. Likewise, the air chambers 144, 145 of the respective intensifiers 118, 119 are also enclosed by a moving piston assembly 142, 143. However, the piston assembly 142, 143 includes an air piston connected by a shaft, rod, or other coupling to a respective fluid piston, that move in conjunction. The differences between the piston diameters allows a lower air pressure acting upon the air piston to generate a similar pressure on the associated fluid chamber as the higher air pressure acting on the accumulator piston. In this manner, and as previously described, the system allows for at least two stages of pressure to be employed to generate similar levels of fluid pressure.

The accumulator fluid chambers 138, 139 are interconnected to a hydraulic motor/pump arrangement 130 via a hydraulic valve 128a. The hydraulic motor/pump arrangement 130 includes a first port 131 and a second port 133. The arrangement 130 also includes several optional valves, including a normally open shut-off valve 125, a pressure relief valve 127, and three check valves 129 that can further control the operation of the motor/pump arrangement 130. For example, check valves 129a, 129b, direct fluid flow from the motor/pump's leak port to the port 131, 133 at a lower pressure. In addition, valves 125, 129c prevent the motor/pump from coming to a hard stop during an expansion cycle.

The hydraulic valve 128a is shown as a 3-position, 4-way directional valve that is electrically actuated and spring returned to a center closed position, where no flow through the valve 128a is possible in the unactuated state. The directional valve 128a controls the fluid flow from the accumulator fluid chambers 138, 139 to either the first port 131 or the second port 133 of the motor/pump arrangement 130. This arrangement allows fluid from either accumulator fluid chamber 138, 139 to drive the motor/pump 130 clockwise or counter-clockwise via a single valve.

The intensifier fluid chambers 146, 147 are also interconnected to the hydraulic motor/pump arrangement 130 via a hydraulic valve 128b. The hydraulic valve 128b is also a 3-position, 4-way directional valve that is electrically actuated and spring returned to a center closed position, where no flow through the valve 128b is possible in the unactuated state. The directional valve 128b controls the fluid flow from the intensifier fluid chambers 146, 147 to either the first port 131 or the second port 133 of the motor/pump arrangement 130. This arrangement allows fluid from either intensifier fluid chamber 146, 147 to drive the motor/pump 130 clockwise or counter-clockwise via a single valve.

The motor/pump 130 can be coupled to an electrical generator/motor and that drives, and is driven by the motor/pump 130. As discussed with respect to the previously described embodiments, the generator/motor assembly can be interconnected with a power distribution system and can be monitored for status and output/input level by the controller 160.

In addition, the fluid lines and fluid chambers can include pressure, temperature, or flow sensors and/or indicators 122 124 that deliver sensor telemetry to the controller 160 and/or provide visual indication of an operational state. In addition, the pistons 136, 137, 142, 143 can include position sensors 148 that report their present position to the controller 160. The position of the piston can be used to determine relative pressure and flow of both gas and fluid.

Figure 3:
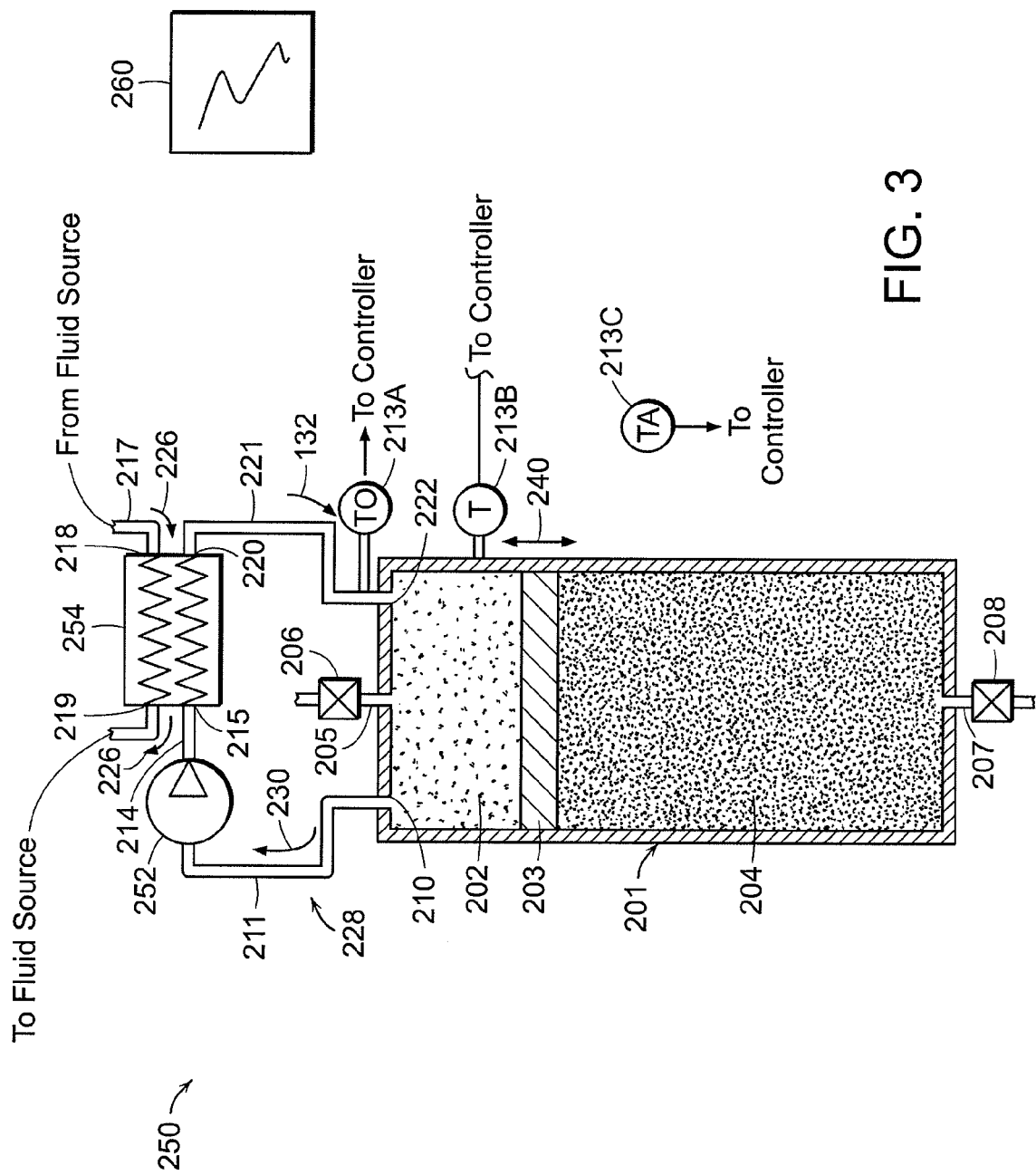
FIG. 3 is a schematic partial cross section of a hydraulic/pneumatic cylinder assembly including a heat transfer subsystem that facilities isothermal expansion within the pneumatic side of the cylinder in accordance with one embodiment of the invention.

FIG. 3 is an illustrative embodiment of an isothermal-expansion hydraulic/pneumatic system 250 in accordance with one embodiment of the invention. The system consists of a cylinder 201 containing a gas chamber or "pneumatic side" 202 and a fluid chamber or "hydraulic side" 204 separated by a movable (double arrow 240) piston 203 or other force/pressure-transmitting barrier that isolates the gas from the fluid. The cylinder 201 can be a conventional, commercially available component, modified to receive additional ports as described below. As will also be described in further detail below, any of the embodiments described herein can be implemented as a cylinder or intensifier in the hydraulic and pneumatic circuits of energy storage and recovery system, such as those described in the '057 application incorporated herein. The cylinder 201 includes a primary gas port 205, which can be closed via valve 206 and that connects with a pneumatic circuit, or any other pneumatic source/storage system. The cylinder 201 further includes a primary fluid port 207 that can be closed by valve 208. This fluid port connects with a source of fluid in the hydraulic circuit of the above-described storage system, or any other fluid reservoir.

The cylinder 201 has one or more gas circulation output ports 210 that are connected via piping 211 to the gas circulator 252. Note, as used herein the term "pipe," "piping" and the like shall refer to one or more conduits that are rated to carry gas or liquid between two points. Thus, the singular term should be taken to include a plurality of parallel conduits where appropriate. The gas circulator 252 can be a conventional or customized low-head pneumatic pump, fan, or any other device for circulating gas. The gas circulator 252 should be sealed and rated for operation at the pressures contemplated within the gas chamber 202. Thus, the gas circulator 252 creates a predetermined flow (arrow 230) of gas up the piping 211 and therethrough. The gas circulator 252 can be powered by electricity from a power source or by another drive mechanism, such as a fluid motor. The mass-flow speed and on/off functions of the circulator 252 can be controlled by a controller 260 acting on the power source for the circulator 252. The controller 260 can be a software and/or hardware-based system that carries out the heat-exchange procedures described herein. The output of the gas circulator 252 is connected via a pipe 214 to the gas input 215 of a heat exchanger 254.

The heat exchanger 254 of the illustrative embodiment can be any acceptable design that allows energy to be efficiently transferred to and from a high-pressure gas flow contained within a pressure conduit to another mass flow (fluid). The rate of heat exchange is based, in part on the relative flow rates of the gas and fluid, the exchange surface area between the gas and fluid and the thermal conductivity of the interface therebetween. In particular, the gas flow is heated in the heat exchanger 254 by the fluid counter-flow 217 (arrows 226), which enters the fluid input 218 of heat exchanger 254 at ambient temperature and exits the heat exchanger 254 at the fluid exit 219 equal or approximately equal in temperature to the gas in piping 214. The gas flow at gas exit 220 of heat exchanger 254 is at ambient or approximately ambient temperature, and returns via piping 221 through one or more gas circulation input ports 222 to gas chamber 202. By "ambient" it is meant the temperature of the surrounding environment, or another desired temperature at which efficient performance of the system can be achieved. The ambient-temperature gas reentering the cylinder's gas chamber 202 at the circulation input ports 222 mixes with the gas in the gas chamber 202, thereby bringing the temperature of the fluid in the gas chamber 202 closer to ambient temperature.

The controller 260 manages the rate of heat exchange based, for example, on the prevailing temperature (T) of the gas contained within the gas chamber 202 using a temperature sensor 213B of conventional design that thermally communicates with the gas within the chamber 202. The sensor 213B can be placed at any location along the cylinder including a location that is at, or adjacent to, the heat exchanger gas input port 210. The controller 260 reads the value T from the cylinder sensor and compares it to an ambient temperature value (TA) derived from a sensor 213C located somewhere within the system environment. When T is greater than TA, the heat transfer subsystem 250 is directed to move gas (by powering the circulator 252) therethrough at a rate that can be partly dependent upon the temperature differential (so that the exchange does not overshoot or undershoot the desired setting). Additional sensors can be located at various locations within the heat exchange subsystem to provide additional telemetry that can be used by a more complex control algorithm. For example, the output gas temperature (TO) from the heat exchanger can measured by a sensor 213A that is placed upstream of the outlet port 222.

The heat exchanger's fluid circuit can be filled with water, a coolant mixture, and/or any acceptable heat-transfer medium. In alternative embodiments, a gas, such as air or refrigerant, can be used as the heat-transfer medium. In general, the fluid is routed by conduits to a large reservoir of such fluid in a closed or open loop. One example of an open loop is a well or body of water from which ambient water is drawn and the exhaust water is delivered to a different location for example, downstream in a river. In a closed loop embodiment a cooling tower can cycle the water through the air for return to the heat exchanger. Likewise, water can pass through a submerged or buried coil of continuous piping where a counter heat-exchange occurs to return the fluid flow to ambient before it returns to the heat exchanger for another cycle.

It should also be clear that the isothermal operation of this invention works in two directions thermodynamically. While the gas is warmed to ambient by the fluid during expansion, the gas can also be cooled to ambient by the heat exchanger during compression, as significant internal heat can build up via compression. The heat exchanger components should be rated, thus, to handle the temperature range expected to be encountered for entering gas and exiting fluid. Moreover, since the heat exchanger is external of the hydraulic/pneumatic cylinder, it can be located anywhere that is convenient and can be sized as needed to deliver a high rate of heat exchange. In addition it can be attached to the cylinder with straightforward taps or ports that are readily installed on the base end of an existing, commercially available hydraulic/pneumatic cylinder.

Figure 4:
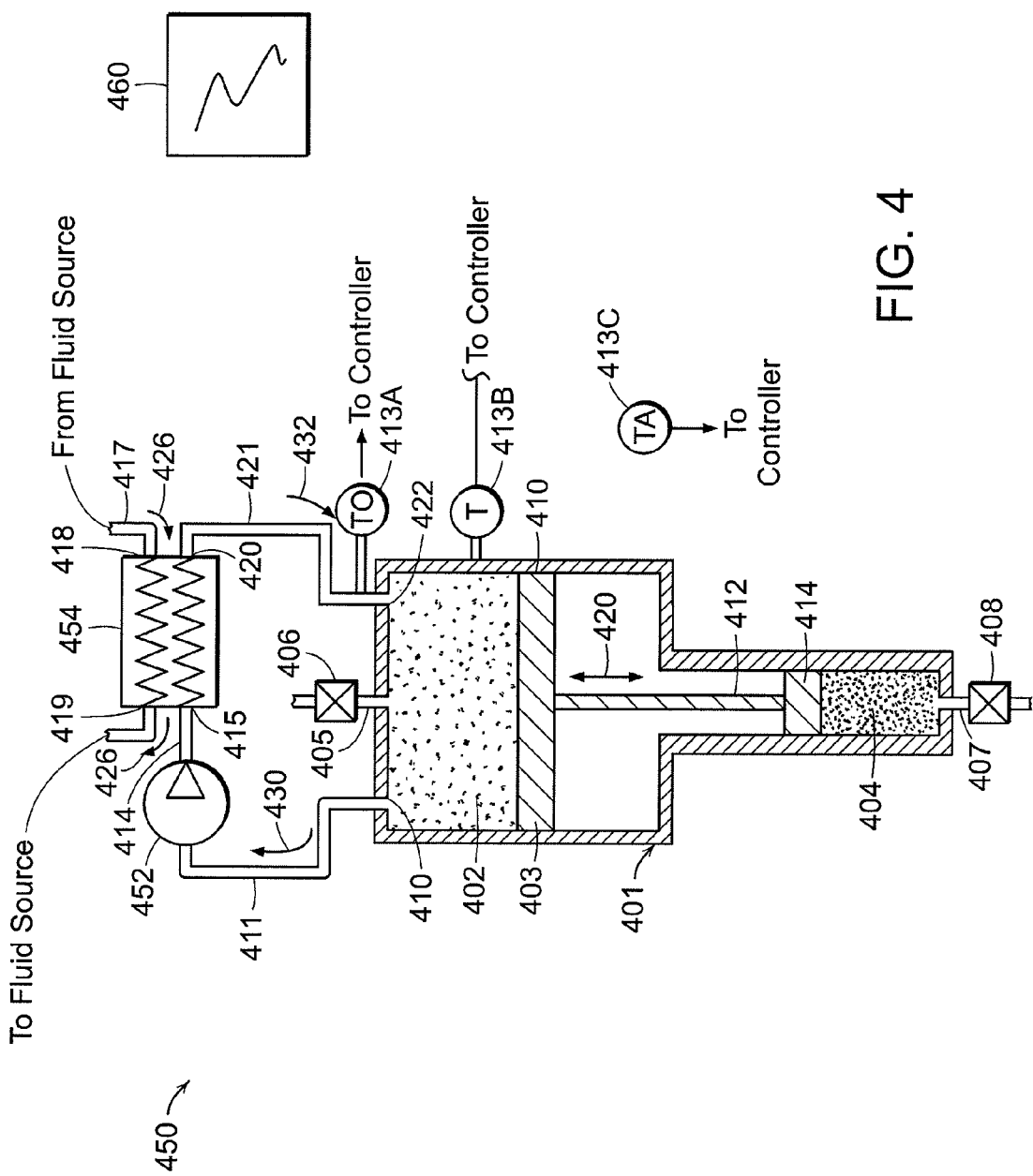
FIG. 4 is a schematic partial cross section of a hydraulic/pneumatic intensifier assembly including a heat subsystem that facilities isothermal expansion within the pneumatic side of the cylinder in accordance with an alternative embodiment of the invention.

Reference is now made to FIG. 4, which details a second illustrative embodiment of the system. In this embodiment, the heat transfer subsystem 450 is similar or identical to the heat transfer subsystems 150, 250 described above. Thus, where like components are employed, they are given like reference numbers herein. The illustrative system in this embodiment comprises an "intensifier" consisting of a cylinder assembly 401 containing a gas chamber 402 and a fluid chamber 404 separated by a piston assembly 403. The piston assembly 403 in this arrangement consists of a larger diameter/area pneumatic piston member 410, tied by a shaft 412 to a smaller diameter/area hydraulic piston 414. The corresponding gas chamber 402 is thus larger in cross section that the fluid chamber 404 and is separated by a moveable (double arrow 420) piston assembly 403. The relative dimensions of the piston assembly 403 results in a differential pressure response on each side of the cylinder 401. That is the pressure in the gas chamber 402 can be lower by some predetermined fraction relative to the pressure in the fluid chamber as a function of each piston members' 410, 414 relative surface area. Such an intensifier can be used as a stage along with the cylinder 201 of FIG. 3 as described in the '057 application incorporated herein. To interface with the incorporated system or another application, the cylinder 401 includes a primary gas port 405 that can be closed via valve 406 and a primary fluid port 407 that can be closed by valve 408.

With reference now to the heat transfer subsystem 450, the intensifier cylinder 401 also has one or more gas circulation output ports 410 that are connected via piping 411 to a gas circulator 452. Again, the gas circulator 452 can be a conventional or customized low-head pneumatic pump, fan, or any other device for circulating gas. The gas circulator 452 should be sealed and rated for operation at the pressures contemplated within the gas chamber 402. Thus, the gas circulator 452 creates a predetermined flow (arrow 430) of gas up the piping 411 and therethrough. The gas circulator 452 can be powered by electricity from a power source or by another drive mechanism, such as a fluid motor. The mass-flow speed and on/off functions of the circulator 452 can be controlled by a controller 460 acting on the power source for the circulator 452. The controller 460 can be a software and/or hardware-based system that carries out the heat-exchange procedures described herein. The output of the gas circulator 452 is connected via a pipe 414 to the gas input 415 of a heat exchanger 454.

Again, the gas flow is heated in the heat exchanger 454 by the fluid counter-flow 417 (arrows 426), which enters the fluid input 418 of heat exchanger 454 at ambient temperature and exits the heat exchanger 454 at the fluid exit 419 equal or approximately equal in temperature to the gas in piping 414. The gas flow at gas exit 420 of heat exchanger 454 is at approximately ambient temperature, and returns via piping 421 through one or more gas circulation input ports 422 to gas chamber 402. By "ambient" it is meant the temperature of the surrounding environment, or another desired temperature at which efficient performance of the system can be achieved. The ambient-temperature gas reentering the cylinder's gas chamber 402 at the circulation input ports 422 mixes with the gas in the gas chamber 402, thereby bringing the temperature of the fluid in gas chamber 402 closer to ambient temperature. Again, the heat transfer subsystem 450 when used in conjunction with the intensifier of FIG. 3 may be particularly sized and arranged to accommodate the performance of the intensifier's gas chamber 402, which may differ thermodynamically from that of the cylinder's gas chamber 402 in the embodiment FIG. 3. Nevertheless, it is contemplated that the basic structure and function of heat exchangers in both embodiments is generally similar. Likewise, the controller 460 can be adapted to deal with the performance curve of the intensifier cylinder. As such, the temperature readings of the chamber sensor 413B, ambient sensor 413C, and exchanger output sensor 413A are similar to those described with respect to sensors 213 in FIG. 3. A variety of alternate sensor placements are expressly contemplated in this embodiment.

Figure 5:
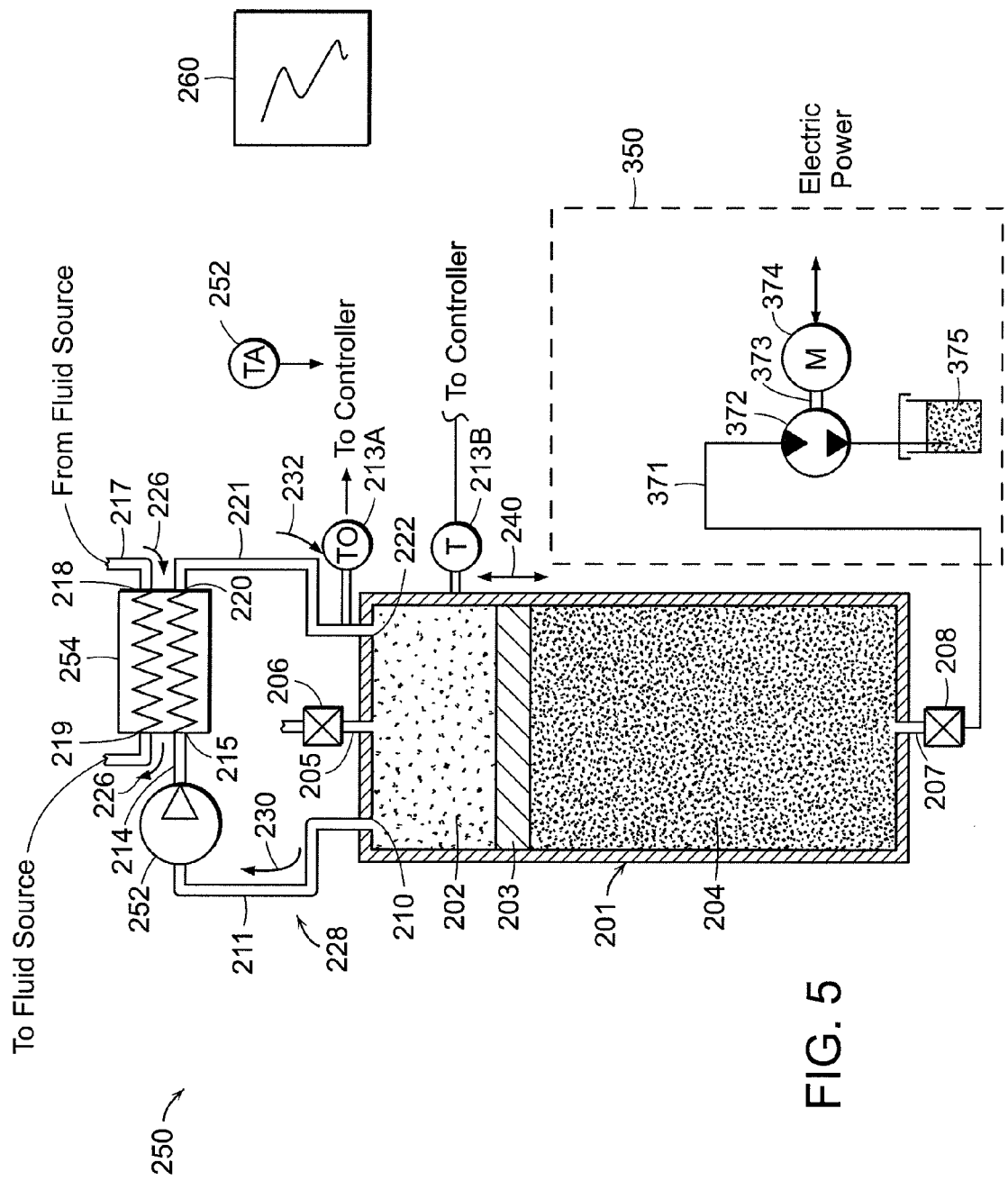
FIG. 5 is a schematic partial cross section of a hydraulic/pneumatic cylinder assembly having a heat transfer subsystem that facilitates isothermal expansion within the pneumatic side of the cylinder in accordance with another alternative embodiment of the invention in which the cylinder is part of a power generating system.

Reference is now made to FIG. 5, which shows the cylinder system shown and described in FIG. 3, in combination with a potential circuit 300. In this embodiment, like reference numbers refer to like components that are described above. This embodiment illustrates the ability of the cylinder 201 to perform work. The above-described intensifier 401 can likewise be arranged to perform work in the manner shown in FIG. 5. In summary, as the pressurized gas in the gas chamber 202 expands, the gas performs work on piston assembly 203 as shown (or on piston assembly 403 in the embodiment of FIG. 4), which performs work on fluid in fluid chamber 204 (or fluid chamber 404), thereby forcing fluid out of fluid chamber 204 (404). Fluid forced out of fluid chamber 204 (404) flows via piping 371 to a hydraulic motor 372 of conventional design, causing the hydraulic motor 372 to a drive a shaft 373. The shaft 373 drives an electric motor/generator 374, generating electricity. The fluid entering the hydraulic the motor 372 exits the motor and flows into fluid receptacle 375. In such a manner, energy released by the expansion of gas in gas chamber 202 (402) is converted to electric energy. The gas may be sourced from an array of high-pressure storage tanks as described in the '057 application incorporated herein. Of course, the heat transfer subsystem maintains ambient temperature in the gas chamber 202 (402) in the manner described above during the expansion process.

In a similar manner, electric energy can be used to compress gas, thereby storing energy. Electric energy supplied to the electric motor/generator 374 drives the shaft 373 that, in turn, drives the hydraulic motor 372 in reverse. This action forces fluid from fluid receptacle 375 into piping 371 and further into fluid chamber 204 (404) of the cylinder 201. As fluid enters fluid chamber 204 (404), it performs work on the piston assembly 203, which thereby performs work on the gas in the gas chamber 202 (402), i.e., compresses the gas. The heat transfer subsystem 250 can be used to remove heat produced by the compression and maintain the temperature at ambient or near-ambient by proper reading by the controller 260 (460) of the sensors 213 (413), and throttling of the circulator 252 (452).

Figure 6A:
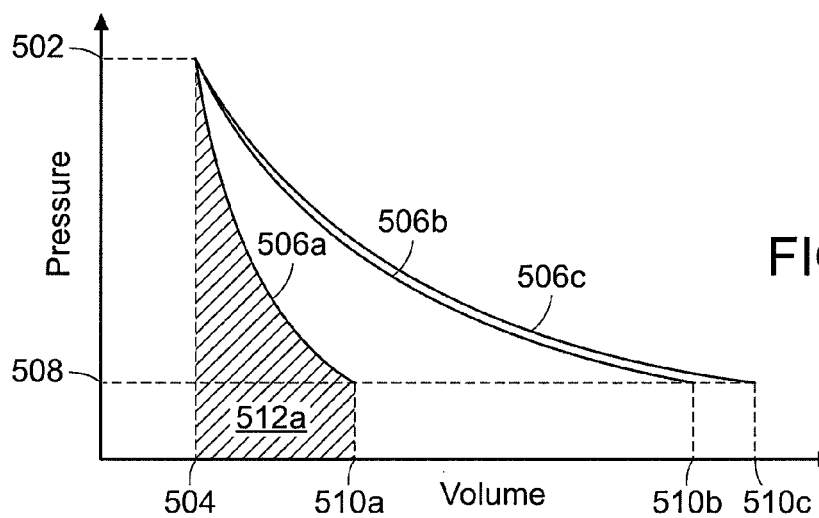
FIG. 6A is a graphical representation of the amount of work produced based upon an adiabatic expansion of gas within the pneumatic side of a cylinder or intensifier for a given pressure versus volume.
Figure 6B:
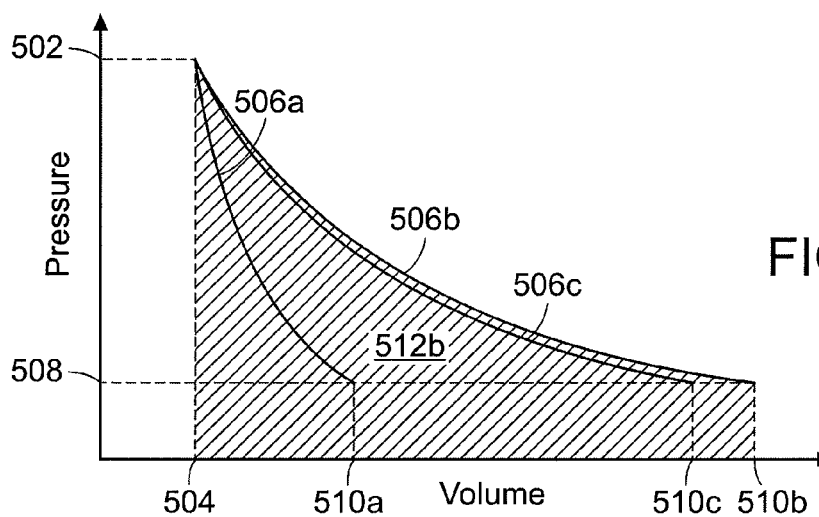
FIG. 6B is a graphical representation of the amount of work produced based upon an ideal isothermal expansion of gas within the pneumatic side of a cylinder or intensifier for a given pressure versus volume.
Figure 6C:
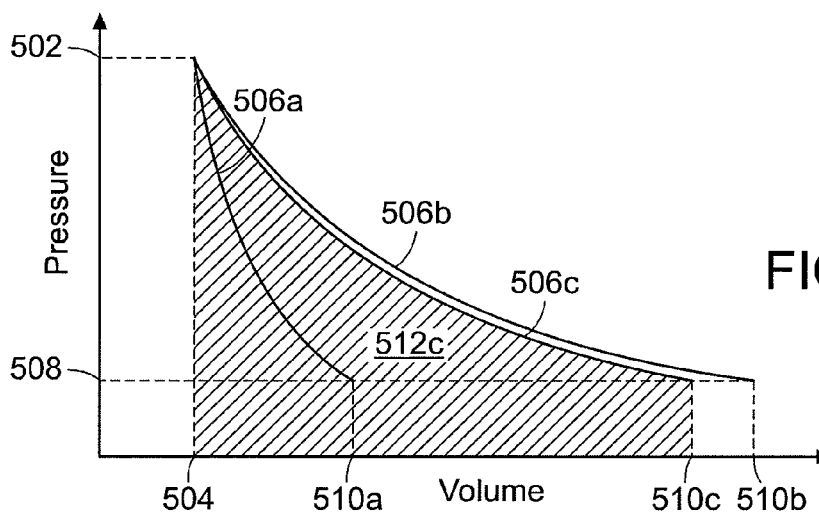
FIG. 6C is a graphical representation of the amount of work produced based upon a near-isothermal expansion of gas within the pneumatic side of a cylinder or intensifier for a given pressure versus volume.

Reference is now made to FIGS. 6A, 6B, and 6C, which respectively show the ability to perform work when the cylinder or intensifier expands gas adiabatically, isothermally, or nearly isothermally. With reference first to FIG. 6A, if the gas in a gas chamber expands from an initial pressure 502 and an initial volume 504 quickly enough that there is virtually no heat input to the gas, then the gas expands adiabatically following adiabatic curve 506a until the gas reaches atmospheric pressure 508 and adiabatic final volume 510a. The work performed by this adiabatic expansion is shaded area 512a. Clearly, a small portion of the curve becomes shaded, indicating a smaller amount of work performed and an inefficient transfer of energy.

Conversely, as shown in FIG. 6B, if the gas in the gas chamber expands from the initial pressure 502 and the initial volume 504 slowly enough that there is perfect heat transfer into the gas, then the gas will remain at a constant temperature and will expand isothermally, following isothermal curve 506b until the gas reaches atmospheric pressure 508 and isothermal final volume 510b. The work performed by this isothermal expansion is shaded area 512b. The work 512b achieved by isothermal expansion 506b is significantly greater than the work 512a achieved by adiabatic expansion 506a. Achieving perfect isothermal expansion may be difficult in all circumstances, as the amount of time required approaches infinity. Actual gas expansion resides between isothermal and adiabatic.

The heat transfer subsystems 150, 250, 450 in accordance with the invention contemplate the creation of at least an approximate or near-perfect isothermal expansion as indicated by the graph of FIG. 6C. Gas in the gas chamber expands from the initial pressure 502 and the initial volume 504 following actual expansion curve 506c, until the gas reaches atmospheric pressure 508 and actual final volume 510c. The actual work performed by this expansion is shaded area 512c. If actual expansion 506c is near-isothermal, then the actual work 512c performed will be approximately equal to the isothermal work 512b (when comparing the area in FIG. 6B). The ratio of the actual work 512c divided by the perfect isothermal work 512b is the thermal efficiency of the expansion as plotted on the y-axis of FIG. 2.

The power output of the system is equal to the work done by the expansion of the gas divided by the time it takes to expand the gas. To increase the power output, the expansion time needs to be decreased. As the expansion time decreases, the heat transfer to the gas will decrease, the expansion will be more adiabatic, and the actual work output will be less, i.e., closer to the adiabatic work output. In the inventions described herein, heat transfer to the gas is increased by increasing the surface area over which heat transfer can occur in a circuit external to, but in fluid communication with, the primary air chamber, as well as the rate at which that gas is passed over the heat exchange surface area. This arrangement increases the heat transfer to/from the gas and allows the work output to remain constant and approximately equal to the isothermal work output even as the expansion time decreases, resulting in a greater power output. Moreover, the systems and methods described herein enable the use of commercially available components that, because they are located externally, can be sized appropriately and positioned anywhere that is convenient within the footprint of the system.

It should be clear to those of ordinary skill that the design of the heat exchanger and flow rate of the pump can be based upon empirical calculations of the amount of heat absorbed or generated by each cylinder during a given expansion or compression cycle so that the appropriate exchange surface area and fluid flow is provided to satisfy the heat transfer demands. Likewise, an appropriately sized heat exchanger can be derived, at least in part, through experimental techniques, after measuring the needed heat transfer and providing the appropriate surface area and flow rate.

The foregoing has been a detailed description of illustrative embodiments of the invention. Various modifications and additions can be made without departing from the spirit and scope if this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the size, performance characteristics, and number of components used to implement the system is highly variable. For example, while a particular implementation of heat exchanger is shown and described, the type and placement of components within the heat transfer subsystem can be highly variable. In an alternative embodiment, the circulator 152, 252, 452 can be located downstream of the heat exchanger(s) 154, 254, 454 rather than upstream, or at both upstream and downstream locations. The flow of gas through the heat exchanger can be further controlled by one or more valves within the subsystem. A variety of other sensors, such as a pressure sensor assembly can also be employed within the heat transfer subsystem.

What is claimed is:

1. A method of substantially isothermal expansion and compression of a gas in an energy storage and recovery system suitable for the efficient use and conservation of energy resources, the method comprising the steps of:
   providing a cylinder assembly having a first side and a second side separated by a boundary mechanism configured to transfer mechanical energy from the first side to the second side, wherein at least one of the sides is a pneumatic chamber;
   at least one of expanding and compressing a gas in the pneumatic chamber of the cylinder assembly, while transferring mechanical energy via the boundary mechanism; and
   circulating the gas through the pneumatic chamber of the cylinder assembly and a heat transfer subsystem in fluid communication therewith to maintain a substantially constant temperature of the gas in the pneumatic chamber of the cylinder assembly.

2. The method of claim 1, wherein the heat transfer subsystem comprises
   a heat exchanger in fluid communication with the pneumatic chamber of the cylinder assembly, and
   circulating the gas comprises circulating the gas through the pneumatic chamber and the heat exchanger.

3. The method of claim 2 further comprising the step of providing a fluid source having a substantially constant temperature to the heat exchanger.

4. The method of claim 3, wherein the fluid source is selected from the group consisting of a body of water, a cooling tower, and a process heat source.

5. The method of claim 2, wherein the heat exchanger comprises a first side and a second side, the first side in fluid communication with the pneumatic chamber of the cylinder assembly, the second side in fluid communication with a fluid source having a constant temperature; and further comprising the step of circulating fluid from the constant temperature fluid source through the second side of the heat exchanger counter to the circulation of the gas through the first side of the heat exchanger.

6. The method of claim 5, wherein the step of providing a heat transfer subsystem further comprises:
   providing a second heat exchanger in fluid communication with the heat exchanger; and
   providing a control valve arrangement configured to direct selectively the constant temperature fluid source between one or both heat exchangers.

7. The method of claim 1 further comprising the step of providing at least one temperature sensor in communication with the pneumatic chamber of the cylinder assembly for monitoring a gas temperature therein.

8. The method of claim 7 further comprising the step of controlling the circulation of the gas through the heat transfer subsystem based on a temperature of the gas in the pneumatic chamber of the cylinder assembly.

9. The method of claim 1, wherein the heat transfer subsystem removes heat from the gas when compressing the gas.

10. The method of claim 1, wherein the heat transfer subsystem adds heat to the gas when expanding the gas.

11. The method of claim 1 further comprising the steps of:
    providing a second cylinder assembly having a first side and a second side separated by a boundary mechanism configured to transfer mechanical energy from the first side to the second side, wherein at least one of the sides is a pneumatic chamber;
    fluidly coupling the pneumatic chamber of the second cylinder assembly with the pneumatic chamber of the cylinder assembly and the heat transfer subsystem; and
    circulating the gas through the pneumatic chamber of the second cylinder assembly and the heat transfer subsystem to maintain a substantially constant temperature of the gas in the pneumatic chamber of the second cylinder assembly.

12. The method of claim 11, wherein the cylinder assembly is an accumulator that transfers the mechanical energy at a first pressure ratio and the second cylinder assembly is an intensifier that transfers the mechanical energy at a second pressure ratio greater that the first pressure ratio.

13. The method of claim 11, wherein the cylinder assemblies are connected in at least one of parallel and series.

14. The method of claim 2, further comprising the step of providing a circulation apparatus in fluid communication with the pneumatic chamber of the cylinder assembly and the heat exchanger.

15. The method of claim 14, wherein the circulation apparatus comprises a positive displacement pump of a type selected from the group consisting of piston, vane, impeller, and gear.

16. The method of claim 2, wherein the heat exchanger is selected from the group consisting of a shell and tube type, a plate type, and a radiator type.

* * * * *